US008901198B2

(12) United States Patent
Kania et al.

(10) Patent No.: US 8,901,198 B2
(45) Date of Patent: *Dec. 2, 2014

(54) UV-CURABLE COATING COMPOSITIONS, MULTI-COMPONENT COMPOSITE COATINGS, AND RELATED COATED SUBSTRATES

(75) Inventors: Charles M. Kania, Natrona Heights, PA (US); Kenneth T. Phelps, New Kensington, PA (US); Kurt A. Humbert, Pittsburgh, PA (US); Todd M. Roper, Valencia, PA (US); Jiping Shao, Monroeville, PA (US); David C. Martin, Bethel Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 414 days.

This patent is subject to a terminal disclaimer.

(21) Appl. No.: 12/940,168

(22) Filed: Nov. 5, 2010

(65) Prior Publication Data

US 2012/0115975 A1 May 10, 2012

(51) Int. Cl.

| C08F 2/50 | (2006.01) |
|---|---|
| C08J 3/28 | (2006.01) |
| C08F 2/48 | (2006.01) |
| C08F 2/46 | (2006.01) |
| C08G 18/79 | (2006.01) |
| C09D 175/16 | (2006.01) |
| C08G 18/67 | (2006.01) |
| C08G 18/32 | (2006.01) |

(52) U.S. Cl.
CPC .............. *C08G 18/792* (2013.01); *C08F 2/48* (2013.01); *C09D 175/16* (2013.01); *C08G 18/672* (2013.01); *C08G 18/3206* (2013.01)
USPC .............. 522/174; 522/90; 522/96; 522/113; 522/114; 522/120; 522/116; 522/150; 522/152; 522/151; 522/8; 522/24; 522/25; 522/26; 522/27; 522/28; 522/29; 522/30

(58) Field of Classification Search
USPC ............. 522/90, 96, 113, 114, 120, 121, 150, 522/152, 151, 174, 8, 24–30
See application file for complete search history.

(56) References Cited

U.S. PATENT DOCUMENTS

| 3,020,255 | A | | 2/1962 | Magrane et al. |
|---|---|---|---|---|
| 4,025,407 | A | | 5/1977 | Chang et al. |
| 4,266,053 | A | | 5/1981 | Imanaka et al. |
| 4,293,678 | A | | 10/1981 | Carter et al. |
| 4,680,204 | A | | 7/1987 | Das et al. |
| 4,847,336 | A | | 7/1989 | Gerhardt |
| 4,908,274 | A | | 3/1990 | Jachmann et al. |
| 4,963,438 | A | | 10/1990 | Weitemeyer et al. |
| 4,978,726 | A | | 12/1990 | Dohler et al. |
| 5,206,295 | A | | 4/1993 | Harper et al. |
| 5,238,744 | A | * | 8/1993 | Williams et al. ............... 428/412 |
| 5,248,789 | A | | 9/1993 | Wolff |
| 5,279,862 | A | | 1/1994 | Corcoran et al. |
| 5,283,126 | A | | 2/1994 | Rasmussen et al. |
| 5,296,571 | A | | 3/1994 | Hori et al. |
| 5,407,818 | A | | 4/1995 | von Gentzkow et al. |
| 5,447,998 | A | | 9/1995 | Grady et al. |
| 5,468,801 | A | | 11/1995 | Antonelli et al. |
| 5,494,815 | A | | 2/1996 | von Gentzkow et al. |
| 5,552,506 | A | | 9/1996 | Ebbrecht et al. |
| 5,672,393 | A | | 9/1997 | Bachmann et al. |
| 5,719,251 | A | | 2/1998 | Wilczek et al. |
| 5,876,268 | A | | 3/1999 | Lamphere et al. |
| 5,885,708 | A | | 3/1999 | Lu et al. |
| 5,899,917 | A | | 5/1999 | Edwards et al. |
| 5,922,783 | A | | 7/1999 | Wojciak |
| 5,942,302 | A | | 8/1999 | Ha et al. |
| 5,977,282 | A | | 11/1999 | Ebbrecht et al. |
| 5,989,462 | A | | 11/1999 | Buazza et al. |
| 5,992,314 | A | | 11/1999 | Lorenz et al. |
| 6,002,511 | A | | 12/1999 | Varaprasad et al. |
| 6,037,014 | A | | 3/2000 | Edgington |
| 6,040,040 | A | | 3/2000 | Rainbow |

(Continued)

FOREIGN PATENT DOCUMENTS

| EP | 0736585 | 9/1999 |
|---|---|---|
| EP | 1726607 | 11/2006 |

(Continued)

OTHER PUBLICATIONS

Industrial Photoinitiators: A Technical Guide. W. Arthur Green, CRC Press 2010, pp. 75-114.*
Sartomer: Oligomer Selection Giude. (1997). [oline]. [Retrieved online Mar. 30, 2012]. Retrieved from the interent: <URL:http://www.univareurope.com/uploads/documents/uk/Sartomer_oligomer.pdf>.*
A comparative kinetic study of commercial photoinitiators for UV/visible curable acrylate clear coatings.N S Allen, J Segurola, M Edge, E Santamari and A McMahon, et al. Surface Coatings International Part B: Coatings Transactions, 1999, vol. 82, No. 2, pp. 67-76.*

(Continued)

*Primary Examiner* — Sanza McClendon
(74) *Attorney, Agent, or Firm* — Christine W. Trebilcock; J. Caleb Franklin

(57) ABSTRACT

Disclosed herein are solventborne liquid UV-curable coating compositions comprising: a radiation curable compound comprising an acrylate-terminated compound having greater than two unsaturated sites, wherein the acrylate-terminated compound comprises a reaction product of reactants comprising: an adduct of a polyisocyanate, wherein the adduct of a polyisocyanate comprises a reaction product of reactants comprising a polyisocyanate comprising greater than two isocyanate groups and a compound having groups reactive with the isocyanate groups of the polyisocyanate; and an active hydrogen-containing acrylate; and a photoinitiator composition that includes a first photoinitiator composition for providing surface cure and a second photoinitiator composition for providing through cure of the resultant coating layer. Also disclosed are related multi-component composite coatings, coated substrates, and methods for coating a substrate.

26 Claims, No Drawings

(56) References Cited

U.S. PATENT DOCUMENTS

| | | | |
|---|---|---|---|
| 6,165,564 A * | 12/2000 | Crast et al. ............... | 427/517 |
| 6,197,844 B1 * | 3/2001 | Hamrock et al. ............ | 522/167 |
| 6,203,911 B1 | 3/2001 | Weberg et al. | |
| 6,211,322 B1 | 4/2001 | Dohler et al. | |
| 6,228,289 B1 | 5/2001 | Powers et al. | |
| 6,254,878 B1 | 7/2001 | Bednarek et al. | |
| 6,268,404 B1 | 7/2001 | Dohler et al. | |
| 6,290,881 B1 | 9/2001 | Krohn | |
| 6,323,253 B1 | 11/2001 | Bennington | |
| 6,326,059 B1 | 12/2001 | Lewin et al. | |
| 6,387,519 B1 | 5/2002 | Anderson et al. | |
| 6,395,822 B1 | 5/2002 | Edgington | |
| 6,432,490 B1 | 8/2002 | Rekowski et al. | |
| 6,498,883 B1 | 12/2002 | Wilson | |
| 6,541,078 B2 | 4/2003 | Rekowski et al. | |
| 6,592,998 B2 | 7/2003 | Anderson et al. | |
| 6,592,999 B1 | 7/2003 | Anderson et al. | |
| 6,593,417 B1 | 7/2003 | Anderson et al. | |
| 6,602,603 B2 | 8/2003 | Welch et al. | |
| 6,610,777 B1 | 8/2003 | Anderson et al. | |
| 6,623,791 B2 | 9/2003 | Sadvary et al. | |
| 6,624,245 B2 | 9/2003 | Wallace et al. | |
| 6,641,923 B2 | 11/2003 | Sadvary et al. | |
| 6,676,795 B1 | 1/2004 | Levandoski | |
| 6,734,221 B1 | 5/2004 | Misiak | |
| 6,750,309 B1 | 6/2004 | Chu et al. | |
| 6,758,734 B2 | 7/2004 | Braunschweig et al. | |
| 6,784,223 B2 | 8/2004 | Krohn | |
| 6,794,055 B2 | 9/2004 | Dean et al. | |
| 6,815,501 B2 | 11/2004 | Flosbach et al. | |
| 6,833,186 B2 | 12/2004 | Perrine et al. | |
| 6,863,848 B2 | 3/2005 | Engardio et al. | |
| 6,908,644 B2 * | 6/2005 | Weingartz ............... | 427/515 |
| 6,960,619 B2 | 11/2005 | Figovsky et al. | |
| 7,053,149 B2 | 5/2006 | Anderson et al. | |
| 7,064,155 B2 | 6/2006 | Wojciak | |
| 7,120,342 B2 | 10/2006 | Chang et al. | |
| 7,141,618 B2 | 11/2006 | Schneider et al. | |
| 7,151,122 B2 | 12/2006 | DeSaw et al. | |
| 7,198,576 B2 | 4/2007 | Sullivan et al. | |
| 7,276,543 B2 * | 10/2007 | Bishop et al. ............ | 522/96 |
| 7,309,732 B1 | 12/2007 | Issari | |
| 7,326,448 B2 | 2/2008 | Jones et al. | |
| 7,329,468 B2 | 2/2008 | Anderson et al. | |
| 7,332,227 B2 | 2/2008 | Hardman et al. | |
| 7,368,171 B2 | 5/2008 | Bushendorf et al. | |
| 7,368,519 B2 | 5/2008 | Chu | |
| 7,399,793 B2 | 7/2008 | Braun et al. | |
| 7,435,453 B2 | 10/2008 | Chen et al. | |
| 7,713,628 B2 | 5/2010 | Botrie et al. | |
| 7,897,261 B2 | 3/2011 | Burgman et al. | |
| 2001/0037008 A1 | 11/2001 | Sherman et al. | |
| 2001/0038890 A1 | 11/2001 | Buazza et al. | |
| 2002/0132871 A1 | 9/2002 | Colton et al. | |
| 2003/0031804 A1 | 2/2003 | Rekowski et al. | |
| 2003/0183960 A1 | 10/2003 | Buazza et al. | |
| 2004/0002617 A1 | 1/2004 | Rantala et al. | |
| 2004/0030038 A1 | 2/2004 | Woltering et al. | |
| 2004/0109853 A1 | 6/2004 | McDaniel | |
| 2004/0151843 A1 | 8/2004 | Weingartz | |
| 2004/0191498 A1 | 9/2004 | White et al. | |
| 2004/0214017 A1 | 10/2004 | Uhlianuk et al. | |
| 2004/0214911 A1 | 10/2004 | DeSaw et al. | |
| 2004/0225057 A1 | 11/2004 | Anderson et al. | |
| 2005/0074617 A1 | 4/2005 | Lin et al. | |
| 2005/0079293 A1 | 4/2005 | Baumgart et al. | |
| 2005/0096427 A1 | 5/2005 | Odajima et al. | |
| 2005/0112286 A1 | 5/2005 | Nguyen et al. | |
| 2005/0119422 A1 | 6/2005 | Baumgart et al. | |
| 2005/0124714 A1 | 6/2005 | Weikard et al. | |
| 2005/0261391 A1 | 11/2005 | Narayan-Sarathy et al. | |
| 2005/0287300 A1 | 12/2005 | Herrwerth et al. | |
| 2006/0047036 A1 | 3/2006 | Lin | |
| 2006/0069233 A1 | 3/2006 | Drysdale et al. | |
| 2006/0204676 A1 | 9/2006 | Jones et al. | |
| 2006/0209098 A1 | 9/2006 | Fuchs et al. | |
| 2006/0228552 A1 | 10/2006 | Schwantes et al. | |
| 2006/0286302 A1 | 12/2006 | Ma et al. | |
| 2006/0287437 A1 | 12/2006 | Ma et al. | |
| 2007/0172668 A1 | 7/2007 | Gruber et al. | |
| 2007/0178263 A1 | 8/2007 | Guilleux et al. | |
| 2007/0185275 A1 | 8/2007 | Molendi | |
| 2008/0050560 A1 | 2/2008 | Jones et al. | |
| 2008/0287622 A1 | 11/2008 | Johnson et al. | |
| 2008/0314519 A1 | 12/2008 | Attarwala et al. | |
| 2009/0029149 A1 | 1/2009 | Kim et al. | |
| 2009/0294692 A1 | 12/2009 | Bourke, Jr. et al. | |
| 2009/0324666 A1 | 12/2009 | Krongauz et al. | |
| 2010/0021737 A1 | 1/2010 | Beck et al. | |
| 2010/0081001 A1 | 4/2010 | Sander et al. | |
| 2010/0092693 A1 | 4/2010 | Park et al. | |

FOREIGN PATENT DOCUMENTS

| | | |
|---|---|---|
| EP | 1625176 | 7/2009 |
| GB | 2067210 | 7/1981 |
| JP | 08017256 | 1/1996 |
| JP | 200319564 | 11/2000 |
| JP | 2000319563 | 11/2000 |
| JP | 2001059904 | 3/2001 |
| WO | 0037569 | 6/2000 |
| WO | 0040663 | 7/2000 |
| WO | 0228938 | 4/2002 |
| WO | 2004020183 | 3/2004 |
| WO | 2004030801 | 4/2004 |
| WO | 2006023790 | 3/2006 |
| WO | 2006045808 | 5/2006 |
| WO | 2007081915 | 7/2007 |
| WO | 2009086285 | 7/2009 |
| WO | 2010056345 | 5/2010 |

OTHER PUBLICATIONS

Photoinitiators for UV Curing: Key Product Selection Guide. Ciba Specialty Chemicals. (2003). online. [retrieved online of Mar. 30, 2012]. Retreived from Internet: <URL:http://forums.reprap.org/file.php?184,file=30,filename=Photoinitiator_UVCURING_March05.pdf>.*

Darocur 1173: Ciba Specialty Chemicals (2001). online. [Retrieved online Mar. 30, 2012]. Retrived from Internet <URL:http://people.rit.edu/deeemc/courses/0305-676/reference/Imprint/darocur_1173-2.pdf>.*

Lucirin TPO: BASF. (2001). online. [retrieved online Mar. 30, 2012]. Retrieved from internet <URL: http://www2.basf.us/rawmaterials/pdfs/LUC-TPO.pdf>.*

Darocur 4256: Liquid Photoinitiators for UV Coatings—Ciba. (no date). online. [retrieved online Mar. 30, 2012]. Retrieved from internet: <URL: http://www.tri-iso.com/SiteAdmin/Portals/0/12_104_Darocu r%204265.pdf>.*

Hrdlovic et al. Effects of Substituents on Ultraviolet Spectra of Derivatives of O-Hydroxybenzophenone. Chemicke Zvesti, 22, 508-513 (1968).*

Bayer Material Science. Technical Data Sheet for Desmodur: Raw Materials for Automotive Refinish Systems. pp. 1-24 (No Date Provides).*

"Industrial Photoinitiators, A Technical Guide", W. Arthur Green, CRC Press 2010, pp. 195, 242, 243, 250.

* cited by examiner

UV-CURABLE COATING COMPOSITIONS, MULTI-COMPONENT COMPOSITE COATINGS, AND RELATED COATED SUBSTRATES

FIELD OF THE INVENTION

The present invention relates to UV-curable coating compositions, multi-component composite coatings, and related coated substrates.

BACKGROUND INFORMATION

Despite their many environmental and energy savings advantages, UV-curable ("ultraviolet light") compositions are used successfully in limited commercial applications. It would be desirable, therefore, to provide UV-curable compositions capable of producing coatings having performance characteristics that might render the compositions desirable for use in applications that, heretofore, have rarely, if ever, employed radiation cure technology. Such performance characteristics include, for example, good gloss and a smooth pleasing appearance suitable for, among other things, automotive applications, resistance to scratch and mar, acid resistance, and exterior durability.

SUMMARY OF THE INVENTION

One exemplary embodiment of the present invention discloses a solventborne liquid UV-curable coating composition comprising an acrylate-terminated compound having greater than two unsaturated sites, wherein the acrylate-terminated compound comprises a reaction product of reactants comprising: (i) an adduct of a polyisocyanate, wherein the adduct of a polyiscyanate comprises a reaction product of reactants comprising a polyisocyanate comprising greater than two isocyanate groups and a compound having groups reactive with the isocyanate groups of the polyisocyanate; and (ii) an active hydrogen-containing acrylate.

Other related exemplary embodiments disclose multi-component composite coatings, coated substrates, and methods for coating a substrate.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to solventborne liquid UV-curable coating compositions. As used herein, the term "solventborne" means that the coating composition is not an aqueous and/or waterborne coating composition and that the nonsolid portion of the coating composition is substantially free, or in some cases, completely free of water. As used herein, the term "substantially free of water" means that water is present in the coating composition at a level of 1 weight percent or less, based on the total weight of the coating composition. As used herein, the term "completely free of water" means that there is no water present in the coating composition.

As used herein, the term "liquid" refers to coating compositions that are flowable and does not include powder coating compositions, powder slurry coating compositions, and/or adhesive compositions.

As used herein, the term "UV-curable coating composition" refers to a coating composition that comprises a UV-curable (ultraviolet-curable) polymer or monomer. As used herein, a "UV-curable polymer or monomer" refers to polymers or monomers having reactive components that are polymerizable by exposure to actinic radiation (i.e., ultraviolet light). As used herein, the term "actinic radiation" refers to actinic light, such as ultraviolet light. Any suitable source which emits ultraviolet light having a wavelength of 180 to 400 nanometers may be used in the practice of the present invention. Suitable sources are mercury vapor lamps, carbon arcs, low pressure mercury vapor lamps, medium pressure mercury vapor lamps, high pressure mercury vapor lamps, swirl-flow plasma arcs, ultraviolet light emitting diodes and ultraviolet light emitting lasers.

As previously indicated, the solventborne liquid UV-curable coating compositions of the present invention comprise an acrylate-terminated compound having greater than two unsaturated sites. As used herein, the terms "acrylate," "acrylic," and similar terms refer to the inclusion of the analogous methacrylate and methacrylic based molecules.

As used herein, the term "acrylate-terminated compound" refers to a compound having acrylate groups (i.e., unsaturated sites of carbon carbon double bonds) present at one or more, or all, of the terminal ends of the compound. As indicated, the acrylate-terminated compound has greater than two unsaturated sites. In certain embodiments, the acrylate-terminated compound has greater than three unsaturated sites. In other embodiments, the acrylate-terminated compound has four unsaturated sites.

In certain embodiments, the compositions of the present invention are embodied as a one-component composition. As used herein, the term "one-component coating composition" refers to a coating composition where, during storage of the composition, the composition components are all admixed together but the properties of the composition, including viscosity, remain consistent enough over the time of storage to permit successful application of the coating onto a substrate at a later time.

As previously mentioned, the acrylate-terminated compound that is used in certain embodiments of the present invention is an acrylate-terminated compound having greater than two unsaturated sites comprises a reaction product of reactants comprising: (i) an adduct of a polyisocyanate, wherein the adduct of a polyisocyanate comprises a reaction product of reactants comprising a polyisocyanate comprising greater than two isocyanate groups and a compound having groups reactive with the isocyanate groups of the polyisocyanate; and (ii) an active hydrogen-containing acrylate.

The polyisocyanate comprising greater than two isocyanate groups may be selected from aliphatic polyisocyanates and cycloaliphatic polyisocyanates. The polyisocyanate may include higher functional isocyanates, such as triisocyanates. Nonlimiting examples of polyisocyanates comprising greater than two isocyanate groups include, for example, isocyanurates such as isocyanurate of 1,6-hexamethylene-diisocyanate, isocyanurate of isophorone diisocyanate, isocyanurate of 2,2,4-trimethylhexamethylene-disocyanate, triisocyanatononane, and allophanates. In certain embodiments, the polyisocyanate comprising greater than two isocyanate groups comprises an isocyanurate of 1,6-hexamethylene-diisocyanate, an isocyanurate of isophorone diisocyanate, or combinations thereof.

Compounds having groups reactive with the isocyanate groups of the polyisocyanate may include a compound or polymer having one or more functional groups that are reactive with isocyanate, including for example, a hydroxyl group, an amine group, a thiol group, as well as combinations of these functional groups. As used herein, the term "polymer" refers to prepolymers, oligomers, as well as homopolymers and copolymers.

In certain embodiments, the compound having groups reactive with the isocyanate groups of the polyisocyanate comprises a polyol, a polyamine, a polythiol, or combinations thereof.

In certain embodiments, the molar ratio of the polyisocyanate to the compound having groups reactive with the isocyanate groups of the polyisocyanate is greater than 1:1, such as 2:1 or greater than 2:1, to prepare the adduct of the polyisocyanate.

Suitable polyols may be selected from diols, triols, higher functional polyols, and combinations thereof. Non-limiting examples include pentaerythritol, neopentylglycol, dicidol, trimethylolpropane, and combinations thereof. In certain embodiments, the polyol contains alkyl branching. In other embodiments, the polyol contains hydroxylalkyl branching such as, for example, trimethylolpropane.

In certain embodiments, the polyol does not contain an acid group. As used herein, a material that "does not contain an acid group" refers to the absence of the group —COOH from the material being referred to.

In certain embodiments, the polyol comprises a diol. In other embodiments, the diol comprises $C_2$ to $C_{50}$ carbon atoms. In certain embodiments, the diol comprises monoethylene glycol, 1,2-propylene glycol, 1,3-propylene glycol, 1,4-butylene glycol, 2,3-butylene glycol, 1,5-pentanediol, 1,6-hexanediol, 1,8-octanediol, decanediol, dodecanediol, neopentylglycol, cyclohexanediol, or combinations thereof.

Suitable polyamines may be selected from diamines, triamines, higher functional polyamines, and combinations thereof. Non-limiting examples include ethylenediamine, 1,2-diaminopropane, 1,3-diaminopropane, 1,4-diaminobutane, 1,5-diaminopentane, 1,5-diamino-2-methylpentane, 1,6-diaminohexane, 2,5-dimethyl-2,5-hexanediamine, 1,2-diaminocyclohexane, 1,3-diaminocyclohexane, 1,4-diaminocyclohexane, 2,4-diethyl-6-methyl-1,3-cyclohexanediamine, 1,7-diaminoheptane, 1,8-diaminooctane, 1,10-diaminodecane, 1,12-diaminododecane and triaminononane.

Suitable polythiols may be selected from dithiols, trithiols, higher functional polythiols, and combinations thereof. Nonlimiting examples include 1,2-ethanedithiol, 1,2-propanedithiol, 1,3-propanedithiol, 1,3-butanedithiol, 1,4-butanedithiol, 2,3-butanedithiol, 1,5-pentanedithiol, 1,6-hexanedithiol, 1,8-octanedithiol, 1,9-nonanedithiol, 1,10-decanedithiol, 1,3,5-triazine-2,4,6-trithiol(trimercaptotriazine), trimethylol propane tris(3-mercaptopropionate), trimethylol propane tris(2-mercaptoacetate), pentaerythritol tetrakis(3-mercaptopropionate), and pentaerythritol tetrakis (2-mercapto acetate).

As previously mentioned, the acrylate-terminated compounds of the solventborne liquid UV-curable coating compositions of certain embodiments of the present invention also comprise an active hydrogen-containing acrylate. In certain embodiments, the active hydrogen-containing acrylate comprises hydroxyl-functional acrylates, amine-functional acrylates, or combinations thereof.

Non-limiting examples of suitable hydroxyl-functional acrylates include hydroxyl alkyl acrylates having 2 to 4 carbon atoms in the hydroxyl-alkyl group including hydroxylethyl acrylate, hydroxylethyl(meth)acrylate, hydroxylpropyl acrylate, hydroxylpropyl(meth)acrylate, 4-hydroxylbutyl acrylate, 4-hydroxylbutyl(meth)acrylate, and the like. Also, hydroxyl functional adducts of caprolactone and hydroxylalkyl acrylates can be used.

In certain embodiments, the hydroxyl-functional acrylate is a hydroxylalkyl ester of (meth)acrylic acid containing from 2 to 4 carbon atoms in the alkyl group. In other embodiments, the hydroxyl-functional acrylate comprises hydroxyethyl acrylate, hydroxypropyl acrylate, 4-hydroxybutyl acrylate, hydroxyl vinyl ether, acrylate ester of glycidyl versatate, or combinations thereof.

In certain embodiments, the molar ratio of the active hydrogen-containing acrylate to the adduct of the polyisocyanate is greater than 1:1, such as a molar ratio of 4:1 or greater than 4:1, to prepare the acrylate-terminated compound having greater than two unsaturated sites.

In certain embodiments, the molar ratio of the active hydrogen-containing acrylate to the adduct of the polyisocyanate is greater than 1:1 and less than or equal to 4:1, such as a molar ratio of 4:1, to prepare the acrylate-terminated compound having greater than two unsaturated sites.

In certain embodiments, the acrylate-terminated compound having greater than two unsaturated sites is present in the solventborne liquid UV-curable coating composition at a level from 1 to 90 percent by weight, such as from 20 to 60 percent by weight, based on the total weight of the composition. In certain embodiments, the acrylate-terminated compound having greater than two unsaturated sites is present in the solventborne liquid UV-curable coating composition at a level from about 20 to 100 percent of the total weight of resin solids in the coating composition.

In certain embodiments, there are no free isocyanate groups present on the acrylate-terminated compound. In other words, there are no —NCO groups present on the acrylate-terminated compound which may be available to further react with another material.

In certain embodiments, the acrylate-terminated compound described above comprises a urethane group and does not include any other non-urethane groups, for example, polyester groups, polyether groups, and/or polycarbonate groups.

In certain embodiments, the acrylate-terminated compound of the solventborne liquid UV-curable coating compositions of the present invention has an acid value less than 5.mg KOH/g. For purposes of the present invention, the term "acid value" refers to the number of milligrams of KOH required to neutralize the acid in one gram of a test material and can be measured according to the method described in ASTM D1639. Thus, an acid value expressed as than 5.mg KOH/g as above may also be expressed simply as an acid value of 5.

In certain embodiments, the acrylate-terminated compound is not water-reducible and/or water dispersible. That is, the acrylate-terminated compound is unable to be solubilized and/or stabilized in water.

In certain embodiments, the solventborne liquid UV-curable coating compositions of the present invention comprise a melamine group-containing polyethylenically unsaturated compound. As used herein, the term "melamine group-containing polyethylenically unsaturated compound" refers to compounds comprising a triazine ring having attached thereto a plurality of carbon-carbon double bonds. For example, in certain embodiments, the melamine group-containing polyethylenically unsaturated compound is a melamine group-containing poly(meth)acrylate, which, as used herein, refers to compounds comprising a triazine ring having attached thereto a plurality of (meth)acrylate groups that may be the same or different.

Melamine group-containing poly(meth)acrylates that are believed to be suitable for use in the present invention, include, without limitation, compounds encompassed by the general structure described in U.S. Pat. No. 4,266,053 ("the '053 patent") at col. 2, line 53 to col. 3, line 15, which can be prepared according to the procedure described in the '053 patent at col. 4, line 47 to col. 7, line 60, the cited portions of which being incorporated herein by reference; compounds encompassed by the general structures described in U.S. Pat. No. 5,296,571 ("the '571 patent") at col. 2, lines 1-45 and col. 3, lines 7-59, which can be prepared according to the procedure described in the '571 patent at col. 4, line 1 to col. 7, line 20, the cited portions of which being incorporated herein by reference; and compounds encompassed by the general structure described in U.S. Pat. No. 3,020,255 ("the '255 patent") at col. 2, line 53 to col. 3, line 2, which can be prepared according to the procedure described in the '255 patent at col. 4, lines 13-32, the cited portions of which being incorporated herein by reference.

In certain embodiments, the melamine group-containing polyethylenically unsaturated compound that is used in the present invention comprises a plurality of alkoxy groups, such as methoxy or ethoxy groups. As a result, in certain embodiments, the melamine group-containing polyethylenically unsaturated compound is represented by the general formula:

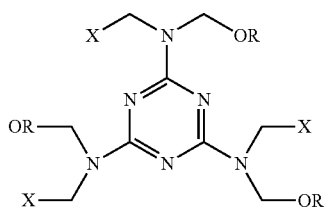

wherein each R, which may be the same or different, represents a $C_1$-$C_4$ alkyl group, such as a methyl group, and each X, which may be the same or different, represents a moiety comprising a carbon-carbon double bond, such as, for example, a (meth)acrylate and/or a (meth)acrylamide. It is believed that compounds encompassed by the foregoing general structure are commercially available from Bomar Specialties Co., an example of which is the multi-functional melamine (meth)acrylate sold under the tradename BMA-250. Moreover, a compound encompassed by the foregoing general structure can be made by reacting a compound encompassed by the general structure described in the '053 patent, referenced above, with formaldehyde.

In certain embodiments of the present invention, the melamine group-containing (meth)acrylate is present in an amount of from 2.5 percent to 50 percent by weight, such as from 5 to 30 percent, with the weight percents being based on the total weight of resin solids in the coating composition.

In certain embodiments, the solventborne liquid UV-curable coating compositions of the present invention may further comprise resins other than the acrylate-terminated compounds having greater than two unsaturated sites described above. In other embodiments, the compositions of the present invention are substantially free, and in some cases completely free, of resins other than the acrylate-terminated compounds having greater than two unsaturated sites described above. The term "substantially free" as it relates to those other resins refers to a level of 1 weight percent or less, based on the total weight of the composition. The term "completely free" as it relates to those other resins refers to no material being present.

Examples of such resins include, without limitation, epoxy acrylates; multi-functional acrylate monomers; amine-acrylate adducts; polyester acrylates; polyalkoxylated and polyether acrylates; acrylated acrylic oligomers; and styrene-maleic anhydride or styrene-acrylic acid oligomers, as well as combinations thereof.

Suitable epoxy acrylates include those products formed by the reaction of acrylic acid with an epoxy (glycidyl) functional component, e.g. aliphatic and aromatic containing epoxy resins, epoxidized oils, acrylic polymers and acrylic grafted polymers in which the acrylic component contains pendent epoxy groups. Some of the acrylic acid may be replaced by other acids, both ethylenically unsaturated and saturated, so as to impart specific properties e.g. aliphatic acids, fatty acids and aromatic acids. These products may alternatively be prepared by the reaction of a carboxylic acid functional component (e.g. polyesters and acrylic polymers) with a second component containing both epoxy groups and ethylenic unsaturation e.g. glycidyl acrylate.

Suitable multi-functional acrylate monomers include, for example, acrylic acid esters of di-, tri- and higher hydroxy functionality alcohols: e.g. polyethylene glycol, polypropylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogs of all the above. In certain embodiments, the composition of the present invention comprises dipentaerythritol pentaacrylate.

Suitable amine-acrylate adducts include, for example, those products prepared by the partial "Michael Type Addition" of primary and secondary amines to ethylenic unsaturation i.e. the double bond of acrylate containing compounds. Examples of amine-acrylate adducts are diethylamine modified trimethylolpropane triacrylate and ethanolamine modified ethoxylated trimethylolpropane triacrylate.

Suitable polyester acrylates may be the reaction products of polyester polyols with acrylic acid. Polyalkoxylated polyolacrylates or polyether acrylates may be obtained by reacting acrylic acid with respectively polyalkoxylated (ethoxylated or/and propoxylated) polyols or polyether polyols (for example polyether based on ethoxy or/and propoxy repeating units). Acrylated acrylic oligomers may be the reaction products of acrylic oligomeric copolymers bearing epoxy groups (derived for example from glycidyl methacrylate) with acrylic acid. Acrylated oligomers of styrene-maleic anhydride or styrene-acrylic acid oligomers may be obtained by at least partial esterification of anhydride or acid groups by a hydroxy alkyl acrylate ($C_2$-$C_8$ alkyl).

The compositions of the present invention may also include a polysiloxane resin, for example, those polysiloxane resins disclosed in U.S. Patent Application Publication No. 2009/0082514 A1 at paragraph [0018] through paragraph [0031]. In other embodiments, the compositions of the present invention are substantially free, and in other cases, completely free of a polysiloxane resin. As used herein, the term "substantially free" as it refers to a polysiloxane resin means that the polysiloxane resin is present at a level of 1 weight percent or less, based on the total weight of the composition. As used herein, the term "completely free" as it refers to a polysiloxane resin refers to no polysiloxane resin being present.

In addition to the previously described components, the compositions of the present invention may include other components, such as, for example, free radical photo initiators. Examples of free radical photoinitiators suitable for use in the present invention include, for example, alpha-cleavage photoinitiators and hydrogen abstraction photoinitiators. Cleavage-type photoinitiators include acetophenone derivatives, alpha-aminoalkylphenones, alpha-hydroxyalkylphenones, alkyl phenylglycoxylates, benzoin alkyl ethers, benzyl ketals, benzoyl oximes, benzimidazoles, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of free radical photoinitiators that may be used in the coating compositions of the present invention include benzil, benzoin, benzoin methyl ether, benzoin isobutyl ether, 2,2-dimethoxy-2-phenylacetophenone, acetophenone, benzophenone, 4,4'-dichlorobenzophenone, 4,4'-bis(N,N'-dimethylamino)benzophenone, diethoxyacetophenone, 2-hydroxy-2-methyl-1-phenylpropan-1-one, 1-hydroxycyclohexylphenyl ketone, 2-hydroxy-1-(4-(2-hydroxyethoxy)phenyl)-2-methyl-1-propanone, methyl phenyl glycoxylate, a mixture of Oxy-phenyl-acetic acid 2-[2-oxo-2-phenyl-acetoxy-ethoxy]-ethyl ester and Oxy-phenyl-acetic acid 2-[2-hydroxy-ethoxy]-ethyl ester, 2-isopropylthioxanthone, 2-benzyl-2-dimethylamino-1-(4-morpholinophenyl)-1-butanone, 2,6-dimethylbenzoyldiphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, 2,6-dimethoxybenzoyldiphenylphosphine oxide, bis(2,6-dimethyoxybenzoyl)-2,4,4-trimethylepentylphosphine oxide, bis(2,6-dimethylbenzoyl)-2,4,4-trimethylpentylphosphineoxide, bis(2,4,6-trimethylbenzoyl)-2,4,4-trimethylpentylphosphine oxide, and bis(2,6-dichlorobenzoyl)-2,4,4-trimethylpentylphosphine oxide, and mixtures thereof. Free radical initiators are commercially available from, for example, Lamberti S.p.A. under the tradename ESACURE®, for example ESACURE® ONE, and Ciba Specialty Chemicals Corporation under the tradename DAROCUR®, for example, DAROCUR® 1173 initiator, IRGACURE®, for example, IRGACURE® 184 initiator and IRGACURE® 500 initiator, and Rahn USA Corporation under the tradename GENOCURE®, for example, GENOCURE® MBF.

In certain embodiments, the coating compositions of the present invention comprise 0.1 to 15 percent by weight of free radical photoinitiator or, in some embodiments, 0.1 to 10 percent by weight, or, in yet other embodiments, 0.1 to 5 percent by weight of free radical photoinitiator based on the total weight of the composition. Moreover, it has been discovered that by careful selection of particular combinations of photoinitiators, in particular amounts, it is possible to provide radiation curable compositions, such as those described herein, that are capable of curing in an oxygen rich atmosphere, such as ambient air, while still providing cured coatings with good physical properties, such as humidity resistance, but with little yellowing.

As a result, in certain embodiments, the coatings compositions of the present invention comprise a photoinitiator composition comprising: (a) a photoinitiator having a maximum absorbance with a molar extinction coefficient of from $1 \times 10^{3.80}$ to $1 \times 10^{4.20}$ (L $mol^{-1}$ $cm^{-1}$) within a wavelength range of 240 to 250 nanometers; (b) a photoinitiator having a maximum absorbance with a molar extinction coefficient of from $1 \times 10^{3.85}$ to $1 \times 10^{4.25}$ (L $mol^{-1}$ $cm^{-1}$) within a wavelength range of 250 to 260 nanometers; and (c) a photoinitiator having a molar extinction coefficient greater than $1 \times 10^2$ (L $mol^{-1}$ $cm^{-1}$) at a wavelength of 380 nanometers.

For purposes of the present invention, the molar extinction coefficient of a particular material can be measured using an absorbance spectrophotometer as described in N. S. Allen et al., Surface Coatings International, (2) 67, 1999.

Photoinitiators having a maximum absorbance with a molar extinction coefficient of from $1 \times 10^{3.80}$ to $1 \times 10^{4.20}$ (L $mol^{-1}$ $cm^{-1}$) within a wavelength range of 240 to 250 nanometers include, for example, 1-hydroxylcyclohexyl phenyl ketone and 2-hydroxy-2-methyl-1-phenylpropan-1-one. Such photoinitiators are commercially available as, for example, IRGACURE® 184 and DAROCUR® 1173.

In fact, in some embodiments, the photoinitiator composition comprises two or more photoinitiators having a maximum absorbance with a molar extinction coefficient of from $1 \times 10^{3.80}$ to $1 \times 10^{4.20}$ (L $mol^{-1}$ $cm^{-1}$) within a wavelength range of 240 to 250 nanometers. In these embodiments, at least one such photoinitiator has a boiling point (at atmospheric pressure) of greater than 120° C., such as greater than 150° C. or greater than 200° C., such as is the case with 1-hydroxylcyclohexyl phenyl ketone (commercially available as IRGACURE® 184) and at least one such photoinitiator has a boiling point (at atmospheric pressure) of no more than 120° C., such as no more than 100° C. or no more than 90° C., such as is the case with 2-hydroxy-2-methyl-1-phenylpropan-1-one (commercially available as DAROCUR® 1173). More specifically, in certain embodiments, the photoinitiator composition comprises (i) a photoinitiator having a maximum absorbance with a molar extinction coefficient of from $1 \times 10^{3.80}$ to $1 \times 10^{4.20}$ (L $mol^{-1}$ $cm^{-1}$) within a wavelength range of 240 to 250 nanometers that has a boiling point (at atmospheric pressure) of greater than 120° C., and (ii) a photoinitiator having a maximum absorbance with a molar extinction coefficient of from $1 \times 10^{3.80}$ to $1 \times 10^{4.20}$ (L $mol^{-1}$ $cm^{-1}$) within a wavelength range of 240 to 250 nanometers that has a boiling point (at atmospheric pressure) of no more than 120° C., wherein the weight ratio of (i) to (ii) is at least 1:1, in some cases at least 2:1, and, in yet other cases, 2:1 to 3:1.

In certain embodiments, the coating compositions of the present invention comprise up to 5 percent by weight, such as up to 2 percent by weight, or, in some cases, up to 1.5 percent by weight, or, in yet other cases, up to 1.2 percent by weight, of free radical photoinitiator(s) having a maximum absorbance with a molar extinction coefficient of from $1\times10^{3.80}$ to $1\times10^{4.20}$ (L mol$^{-1}$ cm$^{-1}$) within a wavelength range of 240 to 250 nanometers, such weights percent being based on the total weight of the composition. In certain embodiments, the coating compositions of the present invention comprise at least 0.1 percent by weight, such as at least 0.5 percent by weight, or, in some cases at least 0.8 percent by weight, or, in yet other cases, at least 0.9 percent by weight, of free radical photoinitiator(s) having a maximum absorbance with a molar extinction coefficient of from $1\times10^{3.80}$ to $1\times10^{4.20}$ (L mol$^{-1}$ cm$^{-1}$) within a wavelength range of 240 to 250 nanometers.

Photoinitiators having a maximum absorbance with a molar extinction coefficient of from $1\times10^{3.85}$ to $1\times10^{4.25}$ (L mol$^{-1}$ cm$^{-1}$) within a wavelength range of 250 to 260 nanometers include oligo[2-hydroxy-1-(4-(2-hydroxyethoxy)phenyl)-2-methyl-1-propanone], methyl phenyl glycoxylate, 2,2-dimethoxy-2-phenylacetophenone and the chemical mixture of oxy-phenyl-acetic acid 2-[2-oxo-2-phenyl-acetoxyethoxy]-ethyl ester and oxy-phenyl-acetic acid 2-[2-hydroxyethoxy]-ethyl ester. Such photoinitiators are commercially available as, for example, ESACURE® ONE, GENOCURE® MBF, IRGACURE® 651 and IRGACURE® 754.

In certain embodiments, the coating compositions of the present invention comprise up to 2 percent by weight, such as up to 1 percent by weight, or, in some cases up to 0.6 percent by weight, or, in yet other cases, up to 0.5 percent by weight, of free radical photoinitiator having a maximum absorbance with a molar extinction coefficient of from $1\times10^{3.85}$ to $1\times10^{4.25}$ (L mol$^{-1}$ cm$^{-1}$) within a wavelength range of 250 to 260 nanometers, such weights percent being based on the total weight of the composition. In certain embodiments, the coating compositions of the present invention comprise at least 0.1 percent by weight, such as at least 0.2 percent by weight, or, in some cases at least 0.3 percent by weight, or, in yet other cases, at least 0.4 percent by weight, of free radical photoinitiator having a maximum absorbance with a molar extinction coefficient of from $1\times10^{3.85}$ to $1\times10^{4.25}$ (L mol$^{-1}$ cm$^{-1}$) within a wavelength range of 250 to 260 nanometers, such weight percents being based on the total weight of the composition.

Photoinitiators having a molar extinction coefficient greater than $1\times10^{2}$ (L mol$^{-1}$ cm$^{-1}$) at a wavelength of 380 nanometers include 2,4,6-trimethylbenzoyldiphenylphosphine oxide and bis(2,4,6-trimethylbenzoyl)phenyl phosphine oxide. Such photoinitiators are commercially available as, for example, IRGACURE® 819 and DAROCUR® TPO.

In certain embodiments, the coating compositions of the present invention comprise up to 1 percent by weight, such as up to 0.5 percent by weight, or, in some cases up to 0.2 percent by weight, or, in yet other cases, up to 0.1 percent by weight, of free radical photoinitiator having a molar extinction coefficient greater than $1\times10^{2}$ (L mol$^{-1}$ cm$^{-1}$) at a wavelength of 380 nanometers, such weights percent being based on the total weight of the composition. In certain embodiments, the coating compositions of the present invention comprise at least 0.01 percent by weight, such as at least 0.05 percent by weight, or, in some cases at least 0.06 percent by weight, or, in yet other cases, at least 0.07 percent by weight, of free radical photoinitiator having a molar extinction coefficient greater than $1\times10^{2}$ (L mol$^{-1}$ cm$^{-1}$) at a wavelength of 380 nanometers, such weight percents being based on the total weight of the composition.

It should be noted that certain commercially available photoinitiators comprise a mixture of two or more different types of the photoinitiators described above, such as is the case with, for example, DAROCUR® 4265 (a 50/50 wt % mixture of 2-hydroxy-2-methyl-1-phenylpropan-1-one/2,4,6-trimethylbenzoyldiphenylphosphine oxide), and IRGACURE® 2022 (an 80/20 wt % mixture of 2-hydroxy-2-methyl-1-phenylpropan-1-one/bis(2,4,6-trimethylbenzoyl)phenyl phosphine oxide.

The coating compositions of the present invention may also comprise a catalyst suitable for promoting the reaction between the previously described melamine group-containing polyethylenically unsaturated compound (if present) and the previously described acrylate-containing compounds, such as the reaction of the plurality of alkoxy groups of the alkoxy group containing melamine group-containing (meth)acrylate described above with hydroxy groups of the any of the other materials present in the compositions of the present invention described above. Suitable catalysts for this purpose include acidic materials, for example, acid phosphates such as phenyl acid phosphate, and substituted or unsubstituted sulfonic acids, such as dodecylbenzene sulfonic acid or para-toluene sulfonic acid. The catalyst may be present in an amount ranging from 0.1 to 10.0 percent by weight, such as 0.5 to 4.0 percent by weight, based on the total weight of resin solids in the coating composition.

The compositions of the present invention may also comprise any of a variety of other additives, such as rheology modifiers, surfactants, UV-light stabilizers, sanding additives, antioxidants, solvents, and flatting agents (e.g. wax-coated or non-wax coated silica or other inorganic materials), among other materials.

In certain embodiments, the coating compositions of the present invention may include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture comprising two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent based such as pthalo green or blue, iron oxide, bismuth vanadate, anthraquinone, perylene, aluminum and quinacridone.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. Patent Publication No. 2005/0287348, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 20 weight percent of the present compositions, such as from 3 to 15 weight percent or 5 to 10 weight percent, with weight percent based on the total weight of the compositions.

In certain embodiments, the composition of the present invention is a substantially colorless, transparent clear coating composition. In these embodiments, the composition is substantially free of a colorant, and in some cases, completely free of a colorant. As used herein, the term "substantially free of a colorant" refers to the colorant present at a level of less than 1 percent by weight based on the total weight of the composition. As used herein, the term "completely free of a colorant" refers to no colorant being present in the composition.

The solventborne liquid UV-curable coating compositions of the present invention may be applied directly onto the surface of a substrate or over an underlayer by any suitable coating process known to those of ordinary skill in the art, for example, by dip coating, direct roll coating, reverse roll coating, curtain coating, spray coating, brush coating, vacuum coating and combinations thereof. The method and apparatus for applying the composition to the substrate may be determined, at least in part, by the configuration and type of substrate material.

Accordingly, the present invention is further directed to a substrate at least partially coated with one or more of the present compositions.

The solventborne liquid UV-curable coating compositions of the invention may be useful as top coats and/or clear coats in color-clear composite coatings. The compositions of the invention in the pigmented form can be applied directly to a substrate to form a color coat. Alternately, the coating composition of the invention can be unpigmented, in the form of a clearcoat for application over a color coat (either a primer coat or a colored base coat). When used as a color topcoat, dry film thicknesses can range from 0.1 to 5.0 mils, such as 0.2 to 2.5 mils. When used as a clearcoat, dry film thicknesses can range from 0.1 to 8.0 mils, such as from 0.4 to 6.0 mils.

The present invention is further directed to a multi-component composite coating composition comprising: (a) a basecoat deposited from a pigmented film-forming composition; and (b) a transparent topcoat applied over at least a portion of the basecoat, wherein the transparent topcoat is deposited from a solventborne liquid UV-curable coating composition comprising: an acrylate-terminated compound having greater than two unsaturated sites, wherein the acrylate-terminated compound comprises a reaction product of reactants comprising: (i) an adduct of a polyisocyanate, wherein the adduct of a polyisocyanate comprises a reaction product of reactants comprising a polyisocyanate comprising greater than two isocyanate groups and a compound having groups reactive with the isocyanate groups of the polyisocyanate; and (ii) an active hydrogen-containing acrylate.

The basecoat may have a dry film thickness ranging from 0.1 to 5 mils, such as from 0.2 to 2.5 mils. The transparent topcoat may have a dry film thickness ranging from 0.1 to 8.0 mils, such as from 0.4 to 6.0 mils. The base coat can be cured before application of the topcoat, or the two coats can be cured together. The basecoat can be deposited from a pigmented film-forming composition, while the topcoat formed from the present compositions can be substantially transparent. This is the color-plus-clear system discussed above, frequently used in automotive applications.

Any suitable basecoat known in the art may be used. The basecoat composition may comprise a film-forming polymer, for example, polyether polymers, polyester polymers, acrylic polymers, silicon-based polymers, polyepoxide polymers, polyurethane polymers, and mixtures of any of the foregoing. The basecoat composition may be uncrosslinked or crosslinked, for example, through the addition of a suitable curing agent. One or more curing agents having functional groups reactive with functionality on the film-forming polymer may also be used in the basecoat composition, unless the film-forming polymer can react with itself, in which case additional curing agents may or may not be used. Useful curing agents for film-forming polymers containing hydroxyl groups include polyisocyanates and polyanhydrides. Useful curing agents for polyepoxide polymers include, for example, aliphatic, cycloaliphatic, and aromatic polyfunctional amines; polyamides; and polyureas. The basecoats may be cured at room temperature or at elevated temperatures.

The coating compositions of the present invention can be applied to a variety of substrates, for example automotive substrates such as fenders, hoods, doors and bumpers, and industrial substrates such as household appliances, including washer and dryer panels and lids, refrigerator doors and side panels, lighting fixtures and metal office furniture. Such automotive and industrial substrates can be metallic, for example, aluminum and steel substrates, and non-metallic, for example, thermoplastic or thermoset (i.e. "polymeric") substrates including, for example, transparent plastic substrates, polycarbonate, and polymethyl methacrylate and elastomeric substrates such as thermoplastic polyolefin, as described in more detail below.

Suitable metallic substrates include, but are not limited to, sheets, foils, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Suitable non-metal substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding. In certain embodiments, such a substrate has been coated or treated with a wood stain and or toner prior to application of the compositions of the present invention.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

In certain embodiments, the composition of the present invention may be at least partially cured by irradiating the coated substrate with a curing amount of ultraviolet light. An ultraviolet light source having a wavelength range of 180 to 1000 nanometers may be used to cure the compositions. For example, sunlight, mercury lamps, arc lamps, xenon lamps, gallium lamps, LED lamps and the like may be used. The time of exposure to ultraviolet light and the intensity of the ultraviolet light to which the coating composition is exposed may vary greatly. Generally, the exposure to ultraviolet light should continue until either the film is thermoset throughout or at least cured to the point where subsequent reactions cause the film to thermoset throughout. The appropriate time of exposure and intensity of ultraviolet light used can be determined by those skilled in the art. In one example, the composition may be cured by a 80 W/cm medium pressure mercury UV curing lamp (part no. 25-20008-E), available from Western Quartz Products, Inc., Paso Robles, Calif. having a UV-A intensity of 50 to 2000 W/cm$^2$, for a total UV-A exposure of 100 to 4000 mJ/cm$^2$, such as 500 to 1000 mJ/cm$^2$ as measured by a PP2-2000 Power Puck II Radiometer commercially available from EIT Inc., Sterling, Va.

In other embodiments, the composition of the present invention is capable of cure upon exposure to a combination of thermal energy and radiation. Once applied, the compositions of the present invention can be cured by, for example, thermal energy followed by radiation. For example, the coating composition can be partially reacted by baking the coating at a peak temperature of 110-125° C. (230-255° F.) for about 2-10 minutes, so as to cause the reaction between the previously described melamine group-containing ethylenically unsaturated compounds and the previously described acrylate-containing compounds. The radiation curable moieties present in the coating composition may then be cured by irradiation of the coating composition with ultraviolet rays and/or electron beam radiation, as is known to those skilled in the art. In certain embodiments, the radiation curing can be completed in less than one minute to form a fully cured coating. Moreover, the radiation curing can be conducted in air or an inert atmosphere such as nitrogen or argon.

Illustrating the invention are the following examples that are not to be considered as limiting the invention to their details. All parts and percentages in the examples, as well as throughout the specification, are by weight unless otherwise indicated.

EXAMPLES

Example 1

Preparation of Acrylate-Terminated Compound

To a twelve (12) liter round bottom glass vessel equipped with agitator, thermocouple and charging ports, the following ingredients were added at room temperature under agitation:

| | |
|---|---|
| DESMODUR N 3300[1] isocyanate | 3619.5 grams |
| butyl acetate | 619.3 grams |
| Ionol[2] | 26.86 grams |
| triphenyl phosphate | 5.37 grams |
| dibutyl tin dilaurate | 2.69 grams |

[1]Isocyanate commercially available from Bayer Corporation.
[2]Commercially available from Cognis Corporation.

The above mixture was heated to approximately 65° C. At this temperature, the following feed was added over a period of one hour:

| | |
|---|---|
| hydroxyethyl acrylate | 1752.6 grams |

After 30 minutes, the temperature was measured as approximately 121° C. Upon completion of the feed, the temperature was measured as approximately 133° C. After addition was completed, the temperature was cooled to approximately 120° C. and held for approximately 1 hour 15 minutes. The isocyanate equivalent weight was measured as 2307.

The following charge was then added:

| | |
|---|---|
| 1,4 butanediol | 117.5 grams |
| butyl acetate | 243.0 grams |

The reaction exothermed to a temperature of approximately 134° C. and was held until the isocyanate was completely consumed as measured by disappearance of the NCO peak by IR analysis. This material had a solids content of 86.5% and a viscosity of less than Z-3, measured on a BYK-Gardner bubble viscometer.

Examples Describing the Preparation of Solventborne Liquid UV-Curable Coating Composition The ingredients of Example 2-4 are listed below in Table 1. Charges I and III were added to a flask followed by a mixture comprising Charge II and Charge IV under agitation. Then, Charges V and VI were added in order under agitation. The mixture was stirred for an appropriate time to form a homogeneous solution. The resulting combination was filtered once with a 25 μm filter.

TABLE 1

| | | Formula Weight (g) | | |
|---|---|---|---|---|
| Charge | Component | Example 2 | Example 3 | Example 4 |
| I | Urethane-acrylate of Example 1 | 175.6 | 92.5 | 296.7 |
| | Sartomer SR399[3] | 54.0 | 26.4 | 91.29 |
| | Bomar BMA250[4] | 21.6 | 11.4 | 0 |
| | Sartomer SR351[5] | 0 | 0 | 36.55 |
| II | Esacure ONE[6] | 2.81 | 0 | 0 |
| | Darocur TPO[7] | 1.37 | 0 | 0 |
| | Genocure MBF[8] | 1.15 | 0.8 | 2.57 |
| | Darocur 1173[9] | 0 | 0.4 | 0 |
| | Darocur 4265[10] | 0 | 0.3 | 2.19 |
| | Iragcure 184[11] | 0 | 1.4 | 4.01 |
| III | Tinuvin 123[12] | 1.51 | 0.9 | 3.14 |
| | Tinuvin 400[13] | 3.57 | 2.0 | 7.09 |
| IV | PM Acetate[14] | 5.71 | 0 | 0 |
| | Aromatic Solvent 150[15] | 90.77 | 27.9 | 60.76 |
| | n-Butyl Acetate[16] | 0 | 55.1 | 121.26 |
| V | Tego Glide 450[17] | 0.22 | 0.1 | 0 |
| | Byk 310[18] | 0 | 0.1 | 1.44 |
| VI | K-Cure 129B[19] | 1.99 | 0.8 | 0 |

[3]Monomer commercially available from Sartomer Company, Inc., Exton, PA.
[4]Monomer commercially available from Bomar Specialties Co., Torrington, CT.
[5]Monomer commercially available from Sartomer Company, Inc., Exton, PA.
[6]Photoinitiator commercially available from Lamberti USA, Inc., Conshohocken, PA.
[7]Photoinitiator commercially available from Ciba Specialty Chemicals Corporation, Tarrytown, NY.
[8]Photoinitiator commercially available from Rahn USA, Edina, MN.
[9]Photoinitiator commercially available from Ciba Specialty Chemicals Corporation, Tarrytown, NY.
[10]Photoinitiator commercially available from Ciba Specialty Chemicals Corporation, Tarrytown, NY.
[11]Photoinitiator commercially available from Ciba Specialty Chemicals Corporation, Tarrytown, NY.
[12]Hindered amine light stabilizer commercially available from Ciba Specialty Chemicals Corporation, Tarrytown, NY.
[13]UV absorber commercially available from Ciba Specialty Chemicals Corporation, Tarrytown, NY.
[14]Organic solvent commercially available from Eastman Chemical Co., Kingsport, TN.
[15]Organic solvent commercially available from Eastman Chemical Co., Kingsport, TN.
[16]Organic solvent commercially available from Eastment Chemical Co., Kingsport, TN.
[17]Flow modifier commercially available from Tego Chemie, Essen, Germany.
[18]Flow modifier commercially available from BYK-Chemie GmbH, Wesel, Germany.
[19]Acid commercially available from King Industries, Norwalk, CT.

The coating composition of Example 2-4 was prepared for testing by spray application to pigmented base coats to form a color-plus-clear composite coating over primed electrocoated cold rolled steel (size 4 inches by 12 inches (10.16 cm by 30.48 cm)). The steel panels were coated with ED6060C electrocoat and HP77224ER primer, both commercially available from PPG Industries, Inc. The test panels are available as APR53450 from ACT Test Panels LLC of Hillsdale, Mich. The base coat used was HWB-9517 black pigmented waterborne basecoat, commercially available from PPG Industries, Inc.

The base coat was spray applied in two coats using a conventional Binks model 61 spray gun, commercially available from ITW Industrial Finishing, to the primed electrocoated steel panels at an approximate temperature and relative humidity of 75° F. (23.9° C.) and 50%, respectively. An approximate flash time of thirty seconds was allowed between the two base coat applications. A dry film thickness of about 0.50 to 0.65 mils (about 13 to 16 micrometers) was targeted. The basecoat was allowed to flash under ambient conditions for five minutes and then baked for five minutes at 176° F. (80° C.) and thirty minutes at 285° F. (140° C.) consecutively. The panels were baked in a horizontal position.

The clear coating composition of Example 2 was automated spray applied to a base coated panel at an approximate temperature and relative humidity of 75° F. (23.9° C.) and 50%, respectively. An approximate flash time of thirty seconds was allowed between the two clear coat applications. The coating of Example 2 was targeted for a 1.6 to 1.8 mils (about 41 to 46 micrometers) dry film thickness. The clear coat was allowed to flash ambiently for about five minutes and baked for ten minutes at 255° F. (125° C.). The panel was baked in a horizontal position. The panel was cooled to approximately 176° F. (80° C.) and the coating was cured by exposure to actinic radiation using an 80 W/cm medium pressure mercury UV curing lamp (part no. 25-20008-E), available from Western Quartz Products, Inc., Paso Robles, Calif. The energy and peak irradiance in the UV-A region of the emission spectrum were 1000 mJ/cm$^2$ and 800 mW/cm$^2$, respectively, as measured by a PP2-2000 Power Puck II Radiometer commercially available from EIT Inc., Sterling, Va.

The test panel coated with Example 2 was evaluated for appearance (Gloss), Crockmeter mar resistance, and acid etch resistance along with a commercially available product PPG 502000, commercially available from PPG Industries, Inc.

TABLE 2

| | Results | | | |
|---|---|---|---|---|
| | Example 2 | Example 3 | Example 4 | PPG 502000 |
| 20° Gloss[14] | 88.5 | 90.3 | 84 | 86.5 |
| 9 Micron Crockmeter Mar Gloss Retention (%)[15] | 93% | 89% | 73% | 87% |
| Acid Resistance (min)[16] | >40 | >40 | >40 | 28 |

[14]Byk Gardner Haze-Gloss meter.
[15]Coated panels are marred by applying ten double rubs to the surface using nine-micron paper on a wool felt cloth using a A.A.T.C.C. Crockmeter mar tester (available from Atlas Electric Devices Company). The 20 degree gloss is read on the marred area of the panel after being washed with water and patted dry. The number reported is the percent gloss retention after marring; i.e., 100% × marred gloss/original gloss
[16]A 36% $H_2SO_4$ acid solution is deposited on the coated substrate which is maintained at a temperature of 150° F. (65° C.). The amount of time required for the solution to etch the coating surface is recorded.

Whereas particular embodiments of this invention have been described above for purposes of illustration, it will be evident to those skilled in the art that numerous variations of the details of the present invention may be made without departing from the invention as defined in the appended claims.

We claim:

1. A solventborne liquid UV-curable coating composition comprising:
   a. an acrylate-terminated compound having greater than two unsaturated sites, wherein the acrylate-terminated compound comprises a reaction product of reactants comprising:
      (i) an adduct of a polyisocyanate, wherein the adduct of a polyisocyanate comprises a reaction product of reactants comprising a polyisocyanate comprising greater than two isocyanate groups and a compound having groups reactive with the isocyanate groups of the polyisocyanate; and
      (ii) an active hydrogen-containing acrylate; and
   b. a first photoinitiator composition comprising a first photoinitiator having a peak absorbance with a wavelength range of 250 to 260 nm and second photoinitiator having a peak absorbance with a wavelength range of 240 to 250 nm; and
   c. a second photoinitiator composition which absorbs UV light with a wavelength range of 350 to 410 nm.

2. The solventborne liquid UV-curable coating composition of claim 1, wherein said second photoinitiator composition comprises between about 0.05 and 0.95 weight percent of the total weight of the solventborne liquid UV-curable coating composition.

3. The solventborne liquid UV-curable coating composition of claim 1, wherein (i) the second photoinitiator having a peak absorbance with a wavelength range of 240 to 250 nm comprises a mixture comprising two photoinitiators each having a peak absorbance with a wavelength range of 240 to 250 nm.

4. The solventborne liquid UV-curable coating composition of claim 1, wherein the acrylate-terminated compound has an acid value less than 5 mg KOH/g.

5. The solventborne liquid UV-curable coating composition of claim 1, wherein there are no free isocyanate groups present on the acrylate-terminated compound.

6. The solventborne liquid UV-curable coating composition of claim 1, wherein the polyisocyanate comprises an isocyanurate of isophorone diisocyanate, an isocyanurate of hexamethylene diisocyanate, or combinations thereof.

7. The solventborne liquid UV-curable coating composition of claim 1, wherein the compound having groups reactive with the isocyanate groups of the polyisocyanate comprises a polyol, a polyamine, a polythiol, or combinations thereof.

8. The solventborne liquid UV-curable coating composition of claim 1, wherein the active hydrogen-containing acrylate comprises hydroxyl-functional acrylates, amine-functional acrylates, or combinations thereof.

9. The solventborne liquid UV-curable coating composition of claim 8, wherein the hydroxyl-functional acrylate comprises hydroxyethyl acrylate, hydroxypropyl acrylate, 4-hydroxybutyl acrylate, hydroxyl vinyl ether, acrylate ester of glycidyl versatate, or combinations thereof.

10. The solventborne liquid UV-curable coating composition of claim 7, wherein the polyol does not contain an acid group.

11. The solventborne liquid UV-curable coating composition of claim 7, wherein the polyol comprises a diol.

12. The solventborne liquid UV-curable coating composition of claim 11, wherein the diol comprises $C_2$ to $C_{50}$ carbon atoms.

13. The solventborne liquid UV-curable coating composition of claim 11, wherein the diol contains alkyl branching.

14. The solventborne liquid UV-curable coating composition of claim 12, wherein the diol comprises monoethylene glycol, 1,2-propylene glycol, 1,3-propylene glycol, 1,4-butylene glycol, 2,3-butylene glycol, 1,5-pentanediol, 1,6-hexanediol, 1,8-octanediol, decanediol, dodecanediol, neopentylglycol, cyclohexanediol, or combinations thereof.

15. The solventborne liquid UV-curable coating composition of claim 1, wherein the acrylate-terminated compound is not water-reducible and/or water-dispersible.

16. The solventborne liquid UV-curable coating composition of claim 1, wherein the molar ratio of the polyisocyanate to the compound having groups reactive with the isocyanate groups of the polyisocyanate is 2:1.

17. The solventborne liquid UV-curable coating composition of claim 1 further comprising a resin other than the acrylate-terminated compound.

18. The solventborne liquid UV-curable coating composition of claim 1, wherein the composition is capable of cure upon exposure to a combination of thermal energy and radiation.

19. A solventborne liquid UV-curable coating composition comprising:
   (a) an acrylate-terminated compound having greater than two unsaturated sites, wherein the acrylate-terminated compound comprises a reaction product of reactants comprising:
      (i) an adduct of a polyisocyanate, wherein the adduct of a polyisocyanate comprises a reaction product of reactants comprising a polyisocyanate comprising greater than two isocyanate groups and a compound having groups reactive with the isocyanate groups of the polyisocyanate; and
      (ii) an active hydrogen-containing acrylate;
   (b) a first photoinitiator composition comprising a first photoinitiator having a peak absorbance with a wavelength range of 250 to 260 nm; and
   (c) a melamine group-containing polyethylenically unsaturated compound.

20. The solventborne liquid UV-curable coating composition of claim 19, wherein said melamine group-containing polyethylenically unsaturated compound comprises from 5 to 30 weight percent of the total weight of resin solids in the solventborne liquid UV-curable coating composition.

21. A substrate coated with a coating deposited from the solventborne liquid UV-curable coating composition of claim 1.

22. A multi-component composite coating composition comprising:
   (a) a basecoat deposited from a pigmented film-forming composition; and
   (b) a transparent topcoat applied over at least a portion of the basecoat, wherein the transparent topcoat is deposited from a solventborne liquid UV-curable coating composition comprising:
      (i) an acrylate-terminated compound having greater than two unsaturated sites, wherein the acrylate-terminated compound comprises a reaction product of reactants comprising: an adduct of a polyisocyanate, wherein the adduct of a polyisocyanate comprises a reaction product of reactants comprising a polyisocyanate comprising greater than two isocyanate groups and a compound having groups reactive with the isocyanate groups of the polyisocyanate, and an active hydrogen-containing acrylate;

(ii) a first photoinitiator composition comprising a first photoinitiator having a peak absorbance with a wavelength range of 250 to 260 nm; and second photoinitiator having a peak absorbance with a wavelength range of 240 to 250 nm; and (iii) a second photoinitiator composition which absorbs UV light with a wavelength range of 350 to 410 nm;

wherein the acrylate-terminated compound does not comprise polyether groups.

23. The multi-component composite coating composition of claim 22, wherein said second photoinitiator composition comprises between about 0.05 and 0.95 weight percent of the total weight of the solventborne liquid UV-curable coating composition.

24. The multi-component composite coating composition of claim 20, wherein (1) the second photoinitiator having a peak absorbance with a wavelength range of 240 to 250 nm comprises a mixture comprising two photoinitiators each having a peak absorbance with a wavelength range of 240 to 250 nm.

25. The solventborne liquid UV-curable coating composition of claim 1, wherein the first photoinitiator comprises a Type 2 hydrogen abstraction type photoinitiator.

26. The solventborne liquid UV-curable coating composition of claim 1, wherein the second photoinitiator comprises a Type 1 alpha-cleavage type photoinitiator.

* * * * *